US005203822A

United States Patent [19]

Gürich et al.

[11] Patent Number: 5,203,822

[45] Date of Patent: Apr. 20, 1993

[54] PROCESS AND DEVICE TO MEASURE VOLUME IN ORDER TO DETERMINE THE COMPRESSION RATIO OF AN INTERNAL COMBUSTION ENGINE

[75] Inventors: Gunter Gürich, Aachen; Eugen Schäfer, Bereborn; Norbert Adolph, Aachen; Thomas Schladt, Eitensheim, all of Fed. Rep. of Germany

[73] Assignee: FEV Motorentechnik GmbH & Co., Aachen, Fed. Rep. of Germany

[21] Appl. No.: 682,380

[22] Filed: Apr. 9, 1991

[51] Int. Cl.[5] .............. G01F 17/00

[52] U.S. Cl. .............. 73/149

[58] Field of Search .............. 73/37.5, 49.7, 119 R, 73/117.2, 149, 118.1

[56] References Cited

U.S. PATENT DOCUMENTS

| | | | |
|---|---|---|---|
| 2,341,138 | 2/1944 | Davis | 73/149 |
| 4,448,065 | 5/1984 | Meurer | 73/119 R |
| 4,956,996 | 9/1990 | Morris | 73/149 |

*Primary Examiner*—Robert Raevis

*Attorney, Agent, or Firm*—Watson, Cole, Grindle & Watson

[57] ABSTRACT

A process and a device to measure the compression volume in a cylinder of an internal combustion engine in which process an overpressure in the combustion chamber is produced by introducing a controlled gas flow through existing spark plug or injection nozzle bores. A pressure expansion in the combustion chamber, caused by leakage of the piston rings, is analyzed. The size of leakage is determined by measuring step-by-step varied gas flows, introduced into the chamber and flowing out of the chamber through leakage, and measuring the resulting pressures built up in the chamber at a stationary state of flow and pressure. By combining the leakage characteristic and the pressure expansion characteristic the leaking volume having flowed out of the chamber during the expansion can be determined. With the knowledge of the leaking volume and the pressures and temperatures at the beginning and at the end of the expansion, the compression volume can be calculated with the aid of the general gas equation. In contrast to other known methods, the process makes it possible to determine the compression volume reliably without the need of dismounting the engine or sealing the combustion chamber.

9 Claims, 2 Drawing Sheets

$$VM = \frac{VL}{\frac{P1 \cdot T2}{P2 \cdot T1}} \qquad VL = \int_{T1}^{T2} Q(\ )\,dt$$

$$VM = \frac{VL}{\frac{P1 \cdot T2}{P2 \cdot T1}} \qquad VL = \int_{T1}^{T2} Q(\ )\,dt$$

PROCESS AND DEVICE TO MEASURE VOLUME IN ORDER TO DETERMINE THE COMPRESSION RATIO OF AN INTERNAL COMBUSTION ENGINE

BACKGROUND OF THE INVENTION

The present invention relates to a process and device to measure volume in which a volume to be measured is supplied with a first gas pressure p1, subsequently the pressure p1 is changed to a pressure p2 different from p1, and the volume is computed from the change over time of the gas pressure values.

It is difficult to measure the volume of an irregular or fissured cavity, especially one which is difficult to access or which leaks. This problem arises, e.g., when determining the compression volume of a combustion engine with which the compression ratio can be determined, taking the lifting volume into account. The efficiency of an internal combustion engine, and thus the consumption of fuel, is significantly influenced by the compression ratio so that precise knowledge of the compression volume is of great interest.

DESCRIPTION OF THE PRIOR ART

It is known to determine the compression value of an internal combustion engine by volumetric measurement. The single volumes of the disassembled cylinder head or a cylinder having a piston positioned in its upper dead center are determined by filling the volume to be measured with a liquid. The total volume when taking into consideration the cylinder head seal, results in the compression volume. This process is very complicated, time-consuming and inaccurate. The actual strength of the cylinder head seal is, e.g., dependent on the material and the bearing pressure which are not precisely known in the assembled state. The accuracy of a measurement by volumetric measuring also depends a great deal on the care of the person conducting the measurement since air bubbles or inadequately filled gaps and leakages falsify the result.

In a known process described in German Published Application No. 27 44 737.6, an elastically flexible bladder is introduced into the chamber to be measured and filled with a liquid whose volume is measured. The drawback with this method is that in fissured chambers with narrow gaps, as in the combustion chamber of an engine, all of the volume is not detected.

Other methods for measuring a volume are disclosed in German Published Applications Nos. 29 45 356.3, 32 19 499.4, and 29 45 356.3 in which gas flows out of a container having a known volume into the volume to be measured, or vice versa, and the volume is computed according to the gas equation by means of the measured change in pressure. The drawback with this two chamber method is the need to seal the measured volume.

Methods disclosed in German Published Applications Nos. 39 49 286.3 and 33 15 238.1 accurately meter a quantity of gas introduced into the volume to be measured. The same quantity is then introduced into a known standard volume. The difference in pressure between the two volumes is used to compute the test volume. These methods, however, have drawbacks in that the leakage in the volumes must be so small that it is negligible.

SUMMARY OF THE INVENTION

The present invention provides a new process and a device to measure a volume in which it is possible to determine the volume quickly, simply and accurately, even when the chamber holding the volume leaks.

The present invention overcomes the previously described problems by providing a process which measures the change in the gas flow led into or out of a chamber as a function of the pressure leakage characteristic. The pressure and the temperature in the measured volume are measured as a function of the time during the change in pressure. A gas flow is assigned to each gas pressure value during the change in pressure to determine the flow characteristic as a function of time. A volume change is obtained by integrating the gas flow characteristic as a function of the pressure over the time, and the volume to be measured in consideration of the first pressure and the second pressure and the temperature at the start and end of the pressure change is determined with the aid of the gas equation $p V = m R T$. In this process, the gas flow led into or out of the chamber is measured as a function of the pressure in the chamber during stationary states of flow and pressure.

The invention may be more fully understood with reference to the accompanying drawings and the following description of the embodiments shown in those drawings. The invention is not limited to the exemplary embodiments but should be recognized as contemplating all modifications within the skill of an ordinary artisan.

DETAILED DESCRIPTION OF THE PREFERRED EMBODIMENTS

Figure 1:
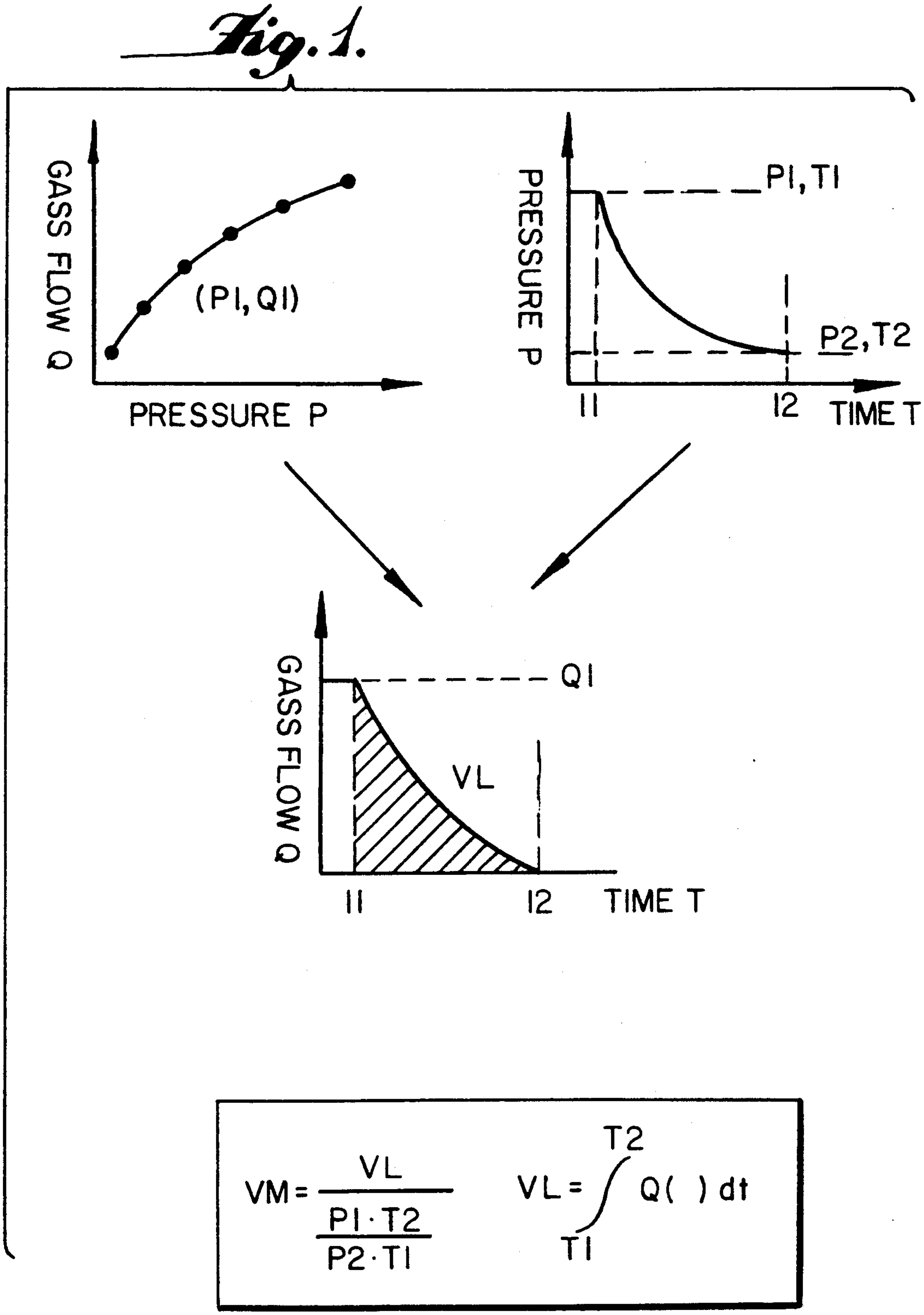
FIG. 1 shows the measurement and evaluation procedures, provided according to the invention, in part as a diagram.

Air flows from a compressed air source 1 (FIG. 2) to a compressed air preparer 2, in which the air pressure is stabilized, thus the production of constant air pressure is controlled. In addition, pollutants of the introduced air, in particular oil and water, are separated out in the compressed air preparer 2.

The air flows from the compressed air preparer 2 to a gas flow controller 3, which measures and controls the gas flow introduced into the chamber to be measured. The gas flow fed in can be denoted as a mass flow in kg/s (kilogram per second) or as a standard volume flow in sl/min (standard liters per minute), with standard volume meaning the mass of gas divided by the density under standard conditions.

A constant gas flow air Q is introduced by means of the gas flow controller 3 through an opened valve 4, and through a connector 5, which provides the connection to the spark plug or injection nozzle bore 8, into the combustion chamber 9 of an internal combustion engine having a piston 10.

The result in the combustion chamber 9 is a pressure, which is dependent on the existing leakages. The pressure is stationary if the amount of gas per unit of time flowing out of the chamber through leakage is the same as the amount of gas per unit of time introduced to it through the spark plug or injection nozzle bore by means of the gas flow controller. The value of the pressure depends on the size of leakage and the value of the gas flow. The resulting stationary pressure p is measured by a pressure meter 7, which is attached in or on the connector 5. The connector 5, in or on which a thermometer 6 is also attached, is screwed preferably directly to the internal combustion engine in which volumetric measurements are to be conducted.

Q is a gas flow, that is constant (defined) at a certain time. But he value of Q is changed step by step and thus the pressure p built up in the chamber also changes. The pairs of values (flow Q and pressure p), each measured in a steady state of flow and pressure, describe the leakage of the combustion chamber and can be figured as a leakage characteristic Q(p). The gas flow Q is a function of pressure p. This relationship is shown in FIG. 1, where the vertical axis denotes the gas flow Q in and out of the chamber while stationary and the horizontal axis denotes the stationary pressure p in the chamber belonging to the gas flow.

Subsequently, maximum value of the quantity of air is defined as maximum flow. Maximum flow is the biggest value of the flow Q, fed in during the determination of the leakage characteristic, and is reintroduced and one waits until the corresponding pressure in the volume to be measured is produced, thus a stationary state of flow and pressure exists. This means that a stationary state of flow and pressure in the chamber has to be generated and that the pressure p corresponds to the flow Q as determined in the leakage characteristic. So one has to wait for decay of the transient oscillations of flow and pressure in the chamber. Then, the quickly switching electromagnetic valve 4 is closed, thus preventing air from continuing to flow into the combustion chamber 9. Before the valve 4 is closed gas flows into the chamber 9 and after it is closed the introduced gas flow is stopped. The drop in pressure, produced as a consequence of the existing leakages, in the combustion chamber is recorded as a function of time, and it can be shown graphically as the expansion function p(t), as shown in the central portion of FIG. 1. The expansion function p(t) has a value p1 of the pressure and a value T1 of the temperature in the instant of time t1, and it has a value p2 of the pressure and a value T2 of the temperature in the instant of time t2.

The expansion function p(t), shown in the central portion of FIG. 1, is combined at this stage with the leakage characteristic Q(p), shown in the upper portion of FIG. 1, in order to obtain the function Q(t) which is a function of the leaking gas flow Q over t time. The obtained function Q(t) is a function of the leaking gas flow Q over time t. This is called the leaking gas flow characteristics Q(t). This can be accomplished with a computer, with graphs, with tables or in any other suitable manner. The leakage volume VL having flowed out is obtained by integrating the function Q(t) over the time from t1 to t2, thus over the expansion time. The corresponding formula is shown on the right side in the lower portion of FIG. 1. The expansion function p(t) is converted into the leaking as flow characteristic Q(t) by means of the leakage characteristic Q(p) as shown in FIG. 1. One step of the calculating procedure is omitted in FIG. 1, but explained in the herein. The expansion function p(t) is converted into the leaking gas flow characteristic Q(t) by means of the leakage characteristic Q(p). At a time $t_x$ the pressure $p_x$ in the chamber can be determined by means of the expansion function p(t). Knowing $p_x$, one can assign a flow $Q_x$ to $_x$ by means of the leakage characteristic Q(p). Thus, the flow $Q_x$ out of the chamber at a time $t_x$ can be determined. By doing this for the whole expansion process for a lot of values of x, the leaking gas flow characteristic Q(t) can be determined.

During the expansion process, which is the pressure drop of the gas in the combustion chamber as a result of leakage, the temperature of the gas is measured with the thermometer 6 at the start of expansion at instant t1 and at the end of expansion at instant t2. Therefore, the values p1 and T1 of the starting state of expansion and the values p2 and T2 of the final state of expansion are known. At this stage, by applying the known "gas equation" pV=mRT, the measured volume VM can be computed. In so doing:

P=absolute pressure
V=volume
m=mass
R=gas constants
T=absolute temperature.

The gas equation can be applied, because it is formed two times for the gas in the chamber. First for state 1 with a high pressure p1 and second for state 2 with a low pressure p2. What has changed, besides the pressure, is the mass of gas in the chamber, because a certain amount of gas has flowed out meanwhile. The amount of gas having flowed out can be determined by integrating the leaking gas flow characteristic Q(t) over the expansion time.

The appropriate formula is shown in the bottom portion of FIG. 1 on the left-hand side. The measured volume VM comprises the compression volume, when piston 10 is in the upper dead center, and the known volume of the connector 5. If the volume of the connector 5 is subtracted from the measured volume VM, the compression volume is obtained.

The chronological sequence of the described process steps can be suitably modified. Thus, it is possible, for example, to do the expansion process p(t) first and then determining the leakage characteristic Q(p). That means an exchange of the two upper portions of FIG. 1 can be done. In so doing, it is always assumed that the leakage conditions in the measured volume do not change during the measurement. The leakage must be stable, that means, with the same gas flow Q there must always be the same pressure p generated in the chamber.

To determine the leakage characteristic Q(p) of the measured volume, gas have been changed step-by-step can be introduced and the resulting pressures are measured. However, it is also possible to produce a controlled pressure in the chamber, e.g., by means of a pressure controller, and to measure the resulting gas flow is needed to hold the pressure at a constant value. The value of the regulated pressure can be changed, e.g., by giving a different rated value to the pressure controller. In so doing, it is advantageous to use atmospheric air. Preferably, one of the pressures, p1 or p2, of the expansion function p(t), can be atmospheric pressure.

Figure 2:
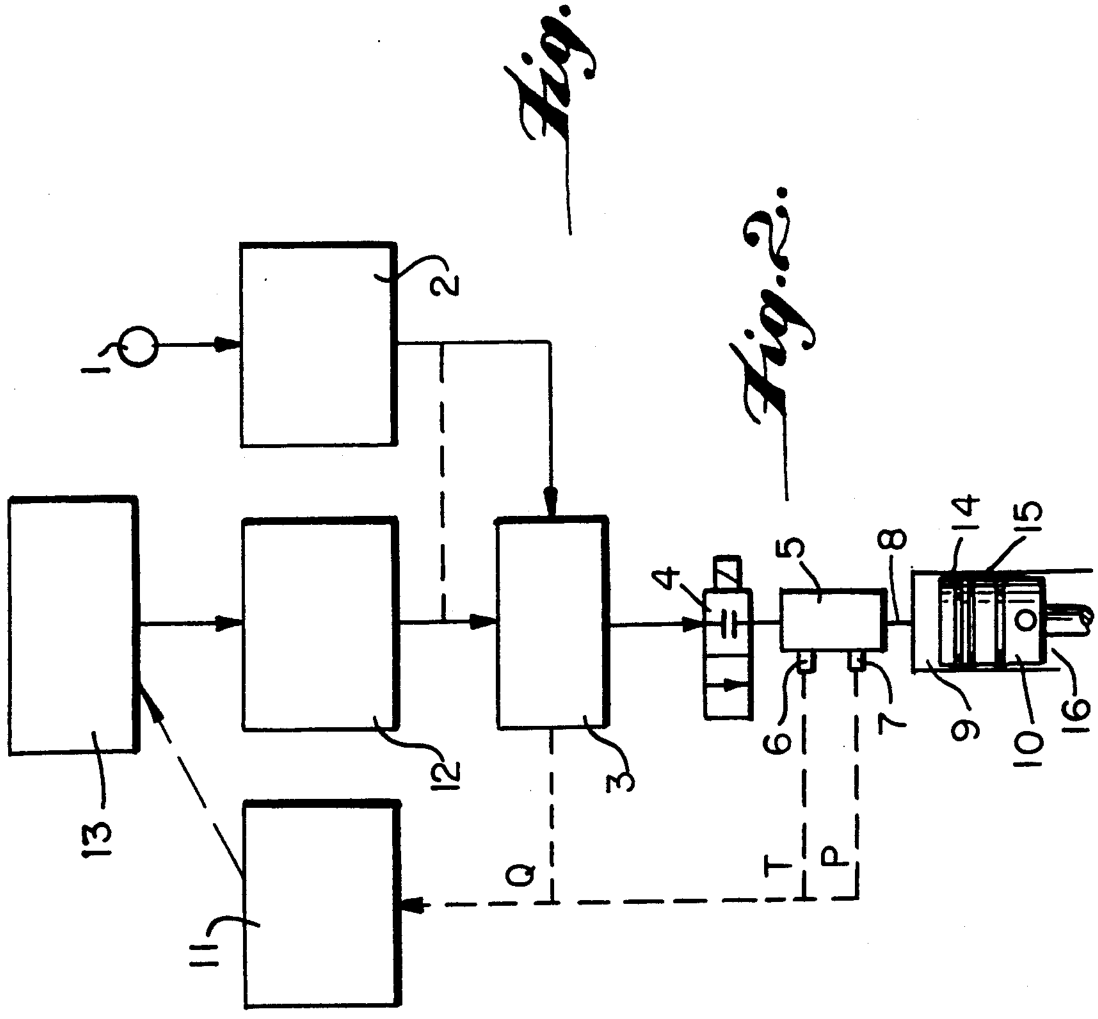
FIG. 2 is a schematic view of a device to measure the compression volume of an internal combustion engine using the process according to the invention.

The described measuring process can also be automated. One example of such a device is shown in FIG. 2.

The evaluation can be conducted with a computer 13. An electronic controller 12, which comprises a digital- /analog converter and a power driver, controls the desired value of the gas flow controller 3 and the switching state of the electromagnetic valve 4. The variables, gas flow Q, pressure p, and temperature T1 and T2, are fed to computer 13 with a device 11 in order to condition measurement data. The device contains a measuring amplifier and an analog/digital converter. In computer 13, the leaking gas flow characteristic Q(t) over time is integrated, the measured volume VM is computed, and the results are issued.

The invention is not restricted to the described process steps and features of the device. It is of fundamental importance that the values of a pressure change p(t) in the measured volume and a leakage characteristic Q(p) of a gas in the measured volume are determined, from which then the time change of the gas flow Q(t) is calculated. The measured volume can then be determined by converting with a known gas equation. In so doing, the pressure change in the measured volume can be both an expansion as well as a compression of the gas. This pressure change can be obtained by the gas flowing in and out through a throttle or by the gas flowing in and out due to leakages in the measured volume.

The device comprising a gas volume controller 3, valve 4, connector 5, thermometer 6, and pressure meter 7 in order to carry out the process, can also be modified in a suitable manner. For example, to measure the flow of the gas volume, a gas mass flow meter can be used, and likewise a gas mass flow meter with integrated mass flow controller can be used.

Figure 3:
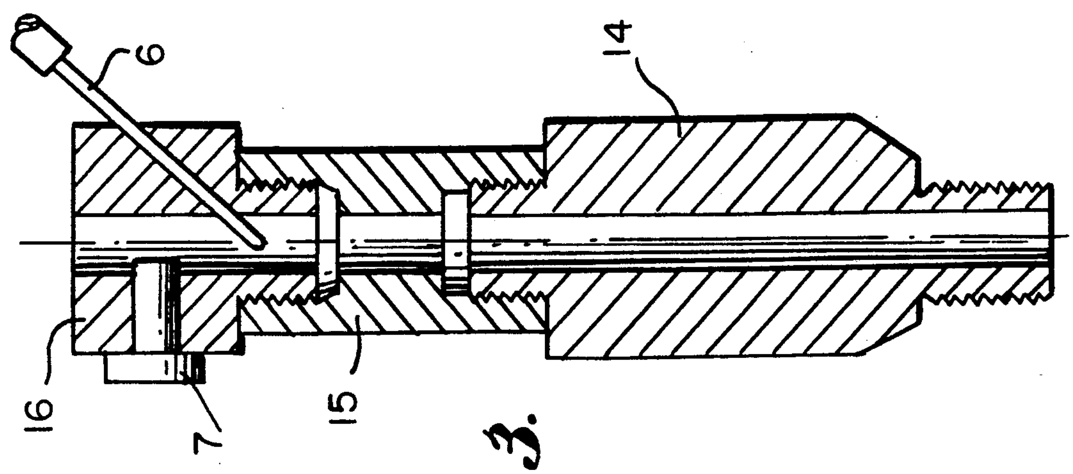
FIG. 3 shows an embodiment of the connector for the measurement device in place in an internal combustion engine.

The connector 5 shown in FIG. 3 advantageously contains a valve-sided connecting member 6, a connecting extension 15 and an engine-sided connecting member 14 as an assembly kit. To adapt to different constructions such as shapes of spark plugs and injection nozzles of internal combustion engines, there can also be provided with the kit a number of engine-sided connecting members 14, whose volume is known with accuracy and in which the fixed volume of the spark plug or injection nozzle is taken into consideration. To take into consideration the built-in chamber of internal combustion engines whose size varies, there can also be a number of connecting extensions 15 of varying lengths. Similarly, a miniature pressure transducer 7 can be used to measure pressure in an advantageous manner. Also, a fast responding thermal element or a temperature sensor with a platinum measurement resistor 6 that is used to measure the temperature can be housed in the valve-sided connecting member 16.

In another advantageous embodiment (not illustrated) the valve 4 can be connected as a subassembly to the connector 5.

Although the valves in accordance with the present invention have been described in connection with preferred embodiments, it will be appreciated by those skilled in the art that additions, modifications, substitutions and deletions not specifically described may be made without departing from the spirit and scope of the invention defined in the appended claims.

We claim:

1. A process to measure the compression volume of a cylinder of an internal combustion engine in which a volume to be measured is supplied with a first gas pressure p1, subsequently the pressure p1 is changed to a pressure p2 which is different from p1 and the compression volume is computed from the change over time of the gas pressure values, wherein the changes of a gas flow led into or sucked out of a leaking combustion chamber are measured as a function of the pressure in the chamber, the pressure and the temperature in the measured volume are measured as a function of time during the change in pressure, a gas flow is assigned to each gas pressure value during the change in pressure, a volume change is obtained by integrating the gas flow as a function of the pressure over time, and the volume to be measured in consideration of the first pressure and the second pressure and the temperature at the start and end of the pressure change is determined with the aid of the gas equation $p \cdot V = m \cdot R \cdot T$, where the gas flow is measured as a function of the pressure during steady states in the measured volume.

2. A process as claimed in claim 1, wherein the pressure change is an expansion of gas in the measured volume.

3. A process as claimed in claim 1, wherein the pressure change is a compression of gas in the measured volume.

4. A process as claimed in claim 1, wherein the pressure change is produced by the gas flowing in or out through a throttle.

5. A process as claimed in claim 1, wherein the pressure change is produced by the gas flowing in or out due to leakages in the measured volume.

6. A process as claimed in claim 1, wherein the first gas pressure p1 in the measured volume is producing by introducing or sucking off a defined gas mass flow.

7. A process as claimed in claim 1, wherein gas mass flows that are changed step-by-step are introduced and the resulting pressures are measured to determine the leakage characteristic Q(p) of the measured volume.

8. A process as claimed in claim 1, wherein different controlled pressures are produced in the combustion chamber by means of a pressure regulator, and the resulting gas flows through leakage are measured by means of a gas flow meter, to determine the leakage characteristic Q(p) of the measured volume.

9. A process as claimed in claim 1, wherein the first gas pressure p1 or the gas pressure p2 is atmospheric pressure.

* * * * *